United States Patent
Gröppel et al.

(10) Patent No.: US 10,479,857 B2
(45) Date of Patent: Nov. 19, 2019

(54) STORAGE-STABLE IMPREGNATING RESINS AND ELECTRICAL INSULATING TAPES

(71) Applicant: Siemens Aktiengesellschaft, Munich (DE)

(72) Inventors: Peter Gröppel, Erlangen (DE); Michael Nagel, Gremsdorf (DE); Mario Brockschmidt, Essen (DE); Regina Mühlberg, Halle (DE); Friedhelm Pohlmann, Essen (DE); Roland Röding, Ellrich (DE); Manuel Weil, Düsseldorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/571,119

(22) PCT Filed: Apr. 14, 2016

(86) PCT No.: PCT/EP2016/058186
§ 371 (c)(1),
(2) Date: Nov. 1, 2017

(87) PCT Pub. No.: WO2016/180595
PCT Pub. Date: Nov. 17, 2016

(65) Prior Publication Data
US 2018/0171066 A1    Jun. 21, 2018

(30) Foreign Application Priority Data

May 8, 2015  (EP) ..................... 15166968

(51) Int. Cl.
*H01B 3/00*        (2006.01)
*C08G 59/40*     (2006.01)
(Continued)

(52) U.S. Cl.
CPC ......... *C08G 59/4021* (2013.01); *C08G 59/50* (2013.01); *C08K 3/22* (2013.01);
(Continued)

(58) Field of Classification Search
CPC . H01B 3/40; H01B 3/00; H01B 3/084; H01B 3/04; C08G 59/4021; C08G 59/50;
(Continued)

(56) References Cited

U.S. PATENT DOCUMENTS 4,265,966 A * 5/1981 Schuh ................ H01B 3/04
427/120
4,456,651 A * 6/1984 Pollmeier ............ H01B 3/04
427/104
(Continued)

FOREIGN PATENT DOCUMENTS

EP      2763142 A1    8/2014
JP      S4842398 A    6/1973
(Continued)

OTHER PUBLICATIONS

EP Search Report dated Jul. 1, 2015, for EP patent application No. 15166968.6.
(Continued)

*Primary Examiner* — Angel R Estrada
(74) *Attorney, Agent, or Firm* — Beusse Wolter Sanks & Maire

(57) ABSTRACT

An anhydride-free impregnating resin for an electrical insulation body, the impregnating resin has an epoxy resin, a curing agent and nanoscale and/or microscale inorganic particles. An impregnable electrical insulating tape for an electrical insulation body has a curing agent applied to the electrical insulating tape. A method includes producing an electrical insulation body An electrical insulation body includes an anhydride-free impregnating resin, where the
(Continued)

impregnating resin has an epoxy resin, a curing agent and nanoscale and/or microscale inorganic particles.

18 Claims, 1 Drawing Sheet

(51) Int. Cl.
| | |
|---|---|
| *C08K 3/22* | (2006.01) |
| *C08K 3/28* | (2006.01) |
| *C08K 3/34* | (2006.01) |
| *C08K 3/36* | (2006.01) |
| *C08L 63/00* | (2006.01) |
| *C08G 59/50* | (2006.01) |
| *H01B 3/40* | (2006.01) |

(52) U.S. Cl.
CPC .............. *C08K 3/28* (2013.01); *C08K 3/34* (2013.01); *C08K 3/36* (2013.01); *C08L 63/00* (2013.01); *H01B 3/40* (2013.01); *C08K 2003/221* (2013.01); *C08K 2003/2227* (2013.01); *C08K 2003/2237* (2013.01); *C08K 2201/011* (2013.01)

(58) Field of Classification Search
CPC ... C08K 3/22; C08K 3/28; C08K 3/34; C08K 3/36; C08K 2003/221; C08K 2003/2227; C08K 2201/011; C08L 63/00
USPC ............ 174/137 B, 135, 110 R, 119, 137 R, 174/138 R, 138 C
See application file for complete search history.

(56) References Cited

U.S. PATENT DOCUMENTS

| | | | | |
|---|---|---|---|---|
| 4,778,703 | A | * | 10/1988 | Fontanilla ................. B32B 7/06 138/149 |
| 5,274,196 | A | * | 12/1993 | Weinberg ............... H01B 3/084 174/121 R |
| 5,427,849 | A | * | 6/1995 | McClintock .......... F16L 59/022 138/128 |
| 7,812,260 | B2 | * | 10/2010 | Miller ........................ C09J 7/04 174/120 R |
| 9,524,808 | B2 | * | 12/2016 | Nelges ................... H01B 3/441 |
| 10,087,198 | B2 | * | 10/2018 | Brockschmidt .......... H01B 3/04 |
| 2007/0252449 | A1 | | 11/2007 | Ikeda et al. |
| 2013/0088842 | A1 | | 4/2013 | Osada |
| 2015/0361245 | A1 | | 12/2015 | Brockschmidt et al. |

FOREIGN PATENT DOCUMENTS

| | | |
|---|---|---|
| JP | S5036040 B1 | 11/1975 |
| JP | S5361099 A | 6/1978 |
| JP | H11213757 A | 8/1999 |
| JP | 2002220432 A | 8/2002 |
| JP | 2002338790 A | 11/2002 |
| JP | 2007294702 A | 11/2007 |

OTHER PUBLICATIONS

International Search Report dated Jun. 16, 2016, for PCT/EP2016/058186.

* cited by examiner

STORAGE-STABLE IMPREGNATING RESINS AND ELECTRICAL INSULATING TAPES

CROSS REFERENCE TO RELATED APPLICATIONS

This application is the US National Stage of International Application No. PCT/EP2016/058186 filed Apr. 14, 2016, and claims the benefit thereof. The International Application claims the benefit of European Application No. EP15166968 filed May 8, 2015. All of the applications are incorporated by reference herein in their entirety.

FIELD OF INVENTION

The invention relates to an anhydride-free impregnating resin for an electrical insulation body, an impregnatable electrical insulation tape for an electrical insulation body, a process for producing an electrical insulation body, the electrical insulation body and the use of the electrical insulation body.

BACKGROUND OF INVENTION

Electrical high-voltage rotational machines, for example generators, comprise electrical conductors, a main insulation and a stator lamination stack. The main insulation has the function of durably insulating the electrical conductors electrically from one another, from the stator lamination stack and from the surroundings. During operation of the machines, electrical partial discharges which lead to formation of "treeing" channels in the main insulation occur. At the "treeing" channels, the main insulation can withstand only reduced electrical potentials and electrical breakdown of the main insulation can occur. A barrier against the partial discharges is achieved by use of an electrical insulation tape. The electrical insulation tape comprises an electrically insulation paper, for example a mica paper, which is applied to a support.

In the production of the main insulation, the electrical insulation tape is firstly wrapped around the conductor and then impregnated with a synthetic resin, for example an epoxy resin. The synthetic resin is subsequently cured. The use of nanosize and/or microsize inorganic particles which are added to the synthetic resin before impregnating and curing in order to improve the resistance of the main insulation is known.

To impregnate the electrical insulation tape, the conductor around which the electrical insulation tape has been wrapped is impregnated with the synthetic resin, for example in a tank in which the synthetic resin is present. Here, only a small proportion of the synthetic resin penetrates into the electrical insulation tape. The proportion of the synthetic resin remaining in the tank is returned to a stock vessel and kept in stock in order to be used at a later point in time for the production of further electrical insulation bodies. For this reason, the storage stability of the remaining synthetic resin is of great importance.

SUMMARY OF INVENTION

It is an object of the invention to provide an impregnating resin for an electrical insulation body and an electrical insulation tape for an electrical insulation body, with both the impregnating resin and also the electrical insulation tape having good storage stability.

The impregnating resin of the invention is an anhydride-free impregnating resin for an electrical insulation body, wherein the impregnating resin comprises an epoxy resin, a hardener and nanosize and/or microsize inorganic particles, and the hardener is selected from the group consisting of a substituted guanidine, an aromatic diamine, an N-acylimidazole, a metal salt complex of an imidazole, a carboxylic hydrazide, a triazine derivative, melamine, a melamine derivative, a cyanoacetyl compound, an N-cyanoacylamide compound, an acylthiopropylphenol, a urea derivative, an aliphatic diamine, a cycloaliphatic diamine, an aliphatic polyamine, a cycloaliphatic polyamine and mixtures thereof.

The impregnating resin of the invention does not comprise any anhydrides. Anhydrides are known as hardeners for epoxy resins. However, owing to their high vapor pressure, their low boiling point and concerns about their toxicity in respect of human beings and the environment, there is a need to replace the anhydrides used for impregnating resins by other hardeners. As a result of the impregnating resin of the invention being free of anhydrides, employees and environment are protected. In addition, the hardeners available for selection of the impregnating resin according to the invention are toxicologically unproblematical.

The inventors have surprisingly found that replacement of the anhydrides by the hardeners used in the impregnating resin of the invention leads to greater storage stability of the impregnating resin.

The surface of the nanosize and/or microsize inorganic particles frequently bears reactive groups such as hydroxyl groups. In a conventional unpolymerized impregnating resin, i.e. an impregnating resin which has not yet been cured, this can bring about local polymerization of the impregnating resin. This polymerization leads to an increase in the viscosity of the impregnating resin, as a result of which the further use of the impregnating resin is made difficult. The inventors have surprisingly found that the replacement of the anhydrides by the hardeners used in the impregnating resin of the invention prevents local polymerization of the impregnating resin. As a result, an increase in the viscosity during storage over a long period of time is avoided. The impregnating resin can therefore be advantageously used for longer, for example for producing further electrical insulation bodies.

The impregnating resin of the invention satisfies the extremely demanding requirements in respect of initial viscosity and storage stability, as are required in total impregnation processes for electrical high-voltage rotational machines, for example turbogenerators. Here, the inorganic particles increase both the resistance of the insulation to electrical partial discharges and also the electrical life of windings of electrical rotating machines. In addition, the particles enable the epoxy resin content of the insulation to be reduced and the thermal conductivity of the insulation to be increased.

In an embodiment, the epoxy resin comprises bisphenol A diglycidyl ether, bisphenol F diglycidyl ether, phenolic novolacs, aliphatic epoxides and/or cycloaliphatic epoxides. Cycloaliphatic epoxides are, for example, 3,4-epoxycyclohexylepoxyethane and 3,4-epoxycyclohexylmethyl-3,4-epoxycyclohexanecarboxylate. In a particular embodiment, the epoxy resin comprises bisphenol A diglycidyl ether and/or bisphenol F diglycidyl ether.

The substituted guanidine is advantageously dicyandiamide, benzoguanamine, formoguanamine, acetoguanamine, o-tolylbiguadinine and/or a cyanoguanidine.

The cyanoguanidine is advantageously
N-cyano-N'-(2,6-diisopropyl-4-phenoxyphenyl)-N"-tert-butylguanidine,
N-cyano-N'-(2,6-dimethyl-4-(3',5'-dichloro-2'-pyridyloxy)-phenyl]-N"-tert-butylguanidine,
N-cyano-N'-cyclohexyl-N"-phenylguanidine,
N-cyano-N'-2-methoxycarbonylethyl-N"-phenylguanidine,
N-allyl-N'-cyano-N"-phenylguanidine,
N'N'-bis(allyl)-N"-cyanoguanidine,
N'N'-bis(1-naphthyl)-N"-cyanoguanidine,
N'N'-bis(cyclohexyl)-N"-cyanoguanidine and/or
an oligomeric cyanoguanidine.

In an embodiment, the substituted guanidine is dicyandiamide. The inventors have found that when dicyandiamide is used as hardener, a particularly good storage stability of the impregnating resin is achieved. In addition, dicyandiamide is toxicologically unproblematical and chemically inert, i.e. it does not react with the epoxy resin, at low temperatures, for example from about 0° C. to about 25° C. The reaction with the epoxy resin can be brought about by introduction of heat.

The aromatic diamine is advantageously
bis(4-aminophenyl) sulfone, bis(3-aminophenyl) sulfone, 4,4'-methylenediamine, 1,2-benzenediamine, 1,3-benzenediamine, 1,4-benzenediamine, bis(4-aminophenyl)-1,4-diisopropylbenzene, bis(4-amino-3,5-dimethylphenyl)-1,4-diisopropylbenzene, bis(aminophenyl) ether, diaminobenzophenone, 2,6-diaminopyridine, 2,4-toluenediamine, diaminodiphenylpropane, 1,5-diaminonaphthalene, xylenediamine, 1,1-bis(4-aminophenylcyclohexane, methylenebis(2,6-diethylaniline), methylenebis(2-isopropyl-6-methylaniline), methylenebis(2,6-diisopropylaniline), 4-aminodiphenylamine, diethyltoluenediamine, phenyl-4,6-diaminotriazine and/or lauryl-4,6-diaminotriazine.

The N-acylimidazole is advantageously
1-(2,6-dichlorobenzoyl)-2-methylimidazole,
1-(2,6-dichlorobenzoyl)-2-phenylimidazole,
1-(2,6-dichlorobenzoyl)-4-phenylimidazole,
1-(2,6-dichlorobenzoyl)-2-ethyl-4-methylimidazole,
1-(2-chloro-6-nitrobenzoyl)-2-phenylimidazole,
1-(2-chloro-6-nitrobenzoyl)-2-ethyl-4-methylimidazole,
1-pentachlorobenzoyl-2-methylimidazole,
1-pentachlorobenzoyl-2-phenylimidazole,
1-pentachlorobenzoyl-2-ethyl-4-methylimidazole,
1-(2,4,6-trimethylbenzoyl)-2-phenylimidazole and/or
1-benzoyl-2-isopropylimidazole.

The metal salt complex of an imidazole is advantageously
a nickel chloride complex of imidazole,
a copper chloride complex of imidazole,
a copper sulfate complex of 2-ethyl-4-methylimidazole,
a copper bromide complex of 2-ethylimidazole,
a cobalt chloride complex of 2-methylimidazole, and/or
a metal salt complex of an imidazole salt.

The metal salt complex of an imidazole salt is advantageously
a copper nitrate complex of 2-ethyl-1,3-dibenzylimidazole chloride,
a copper chloride complex of 1,2-dimethyl-3-dibenzylimidazole chloride,
a cobalt chloride complex of 1-benzyl-2-ethyl-3-methylimidazole chloride,
a copper bromide complex of 1-(2-carbamylethyl)-3-hexylimidazole bromide,
a copper bromide complex of 1,3-dibenzylbenzimidazole chloride, and/or
a copper nitrate complex of 1,3-dibenzylbenzimidazole chloride.

The carboxylic hydrazide is advantageously adipic dihydrazide, isophthalic dihydrazide and/or anthranilic hydrazide.

The triazine derivative is advantageously
2-phenyl-4,6-diamino-s-triazine (benzoguanamine) and/or
2-lauryl-4,6-diamino-s-triazine (lauroguanamine).

The melamine derivative is advantageously an N-substituted melamine, particularly N,N-diallylmelamine, N-ethylmelamine, N,N-diethylmelamine, N-butylmelamine, N-phenylmelamine and/or N-ortho-phenyl(phenylmelamine).

The cyanoacetyl compound is advantageously neopentyl glycol biscyanoacetate, N-isobutylcyanoacetamide, hexamethylene 1,6-biscyanoacetate, 1,4-cyclohexanedimethanol biscyanoacetate, 2,2-(4,4'-dicyanoacetoxyethylphenyl)propane and/or ethyl cyanoacetate.

The N-cyanoacylamide compound is advantageously
N,N'-dicyanoadipamide,
N-cyano-N-beta-methallylacetamide,
N-cyano-N-vinylbenzylacetamide,
N-cyano-N-allylacetamide,
N-cyano-N-2-vinyloxyethylacetamide,
N-isopropyl-N-cyanoacetamide,
N-n-butyl-N-cyanoacetamide,
N-isobutyl-N-cyanoacetamide,
N-n-heptyl-N-cyanoacetamide,
N-benzyl-N-cyanoacetamide,
N-methyl-N-cyanoacetamide,
adipic acid bis(N-cyanomethylamide),
adipic acid bis(N-cyanoethylamide),
adipic acid bis(N-cyanoisopropylamide),
adipic acid bis(N-cyano-n-butylamide),
adipic acid bis(N-cyano-allylamide),
adipic acid bis(N-cyano-2,4-dimethylphenylamide),
glutaric acid bis(N-cyanomethylamide),
glutaric acid bis(N-cyanoethylamide),
glutaric acid bis(N-cyanobenzylamide),
glutaric acid bis(N-cyano-4-nitrobenzylamide),
succinic acid bis(N-cyanomethylamide),
sebacic acid bis(N-cyanomethylamide),
2-methyl glutaric acid bis(N-cyanomethylamide),
4,4'-methylenebis(N-acetylphenylcyanoamide),
1,4-bis(N-acetyl-N-cyanoaminomethyl)benzene,
1,6-bis(N-acetyl-N-cyanoamino)hexane and/or
cis-1,4-bis(N-acetyl-N-cyanoamino)but-2-ene.

The acylthiopropylphenol is advantageously
2,2'-bis(3-acetylthiopropyl-4-hydroxyphenyl)propane and/or (o-acetylthiopropyl)phenol.

The urea derivative is advantageously
toluene-2,4-bis(N,N-dimethylcarbamide),
1,1'-(4-methyl-m-phenylene)bis(3,3-dimethylurea),
1,1'-(methylene-p-phenylene)bis(3,3-dimethylurea),
1,1'-phenylenebis(3,3-dimethylurea),
1,1'-(3,3'-dimethoxy-4,4'-biphenylene)bis(3,3-dimethylurea),
1,1'-(4-methyl-m-phenylene)bis(3,3-aziridinylurea) and/or
N,N'-(4-methyl-m-phenylene)bis(1-piperidinecarboxamide.

The polyamine is advantageously a polyetheramine.
The aliphatic or cycloaliphatic diamines and/or polyamines advantageously react sluggishly or have a reactivity reduced by steric and/or electronic influencing factors. As an alternative or in addition, they are advantageously sparingly soluble or high-melting.

In an embodiment, the hardener is a mixture of two or more hardeners. In a particular embodiment, the mixture comprises dicyandiamide and bis(4-aminophenyl) sulfone.

In an embodiment, the hardener is suspended in a solid state in the epoxy resin. The unpolymerized epoxy resin, i.e. epoxy resin which has not yet been cured, has a liquid state. If the hardener is used in a solid state, a solid/liquid two-phase system is obtained. The storage stability of the impregnating resin increases as a result. In an embodiment, the impregnating resin therefore comprises an epoxy resin in a liquid state, a hardener in a solid state and nanosize and/or microsize inorganic particles.

In an embodiment, the hardener is suspended in the form of particles in the epoxy resin. For this purpose, the particles advantageously have a particle size which allows a very homogeneous suspension to be obtained by stirring. In a particular embodiment, the hardener is suspended in the form of particles having a particle size of 1 μm-100 μm in the epoxy resin. Particles of this size are particularly suitable for achieving a homogeneous suspension of the particles in the epoxy resin. Particles which are smaller than 1 μm can, for example, be removed by sieving.

In an embodiment, the hardener is present in an amount of 1% by weight-15% by weight, advantageously of 4% by weight-10% by weight, based on the epoxy resin. This ratio between the epoxy resin and the hardener has been found to be particularly advantageous.

In an embodiment, the inorganic particles comprise aluminum oxide, aluminum hydroxide, silicon dioxide, titanium dioxide, rare earth oxide, alkali metal oxide, metal nitride and/or sheet silicates, in particular exfoliated or partially exfoliated sheet silicates. These materials are particularly suitable for processing in the high-voltage insulation since they themselves are not electrically conductive. In addition, particles which comprise the abovementioned materials are particularly resistant to high voltage.

The particles are advantageously nanosize particles. Nanosize particles (nanoparticles) have a high specific surface area. The high surface area to volume ratio incurs an increased risk of the reactive groups on the particle surface attacking the resin monomers of the reactive resin. It is consequently advantageous to combine specifically these particles with one or more of the hardeners used in the impregnating resin of the invention in order to protect the impregnating resin from premature polymerization during storage.

In an embodiment, the inorganic particles are present in an amount of 15% by weight-25% by weight, advantageously 17% by weight, based on the epoxy resin. At this amount of inorganic particles, a particularly high resistance of the insulation to high voltage and a good thermal conductivity of the impregnating resin are achieved. At the same time, the amount of the epoxy resin is sufficient to obtain an impregnating resin having good strength. There is therefore an optimal ratio between the epoxy resin and the inorganic particles.

In an embodiment, the impregnating resin further comprises a catalyst. The catalyst increases the reactivity of the hardener, so that the polymerization of the impregnating resin is accelerated. As a result, the polymerization can commence at a temperature of, for example, from about 50° C. to about 90° C., so that partial gelling of the impregnating resin takes place during impregnation of an electrical insulation tape. The presence of the catalyst makes polymerization, i.e. curing of the impregnating resin, possible at a temperature as low as, for example, about 150° C. The use of lower temperatures compared to the absence of the catalysts saves energy, increases the cycle time and provides mild conditions for heat-sensitive substrates.

In an embodiment, the catalyst is selected from the group consisting of zinc naphthenate, cobalt naphthenate, zinc octoate, cobalt octoate, an imidazole, a tertiary amine, an aluminum trisalkylacetoacetate, aluminum trisacetylacetonate, aluminum alkoxide, aluminum acylate, a tetraalkylammonium benzoate and mixtures thereof. These compounds are known as catalysts for the polymerization of epoxy resins. The possibility of retaining known catalysts is an advantage of the impregnating resin of the invention. The catalysts can, in the interests of better processability, have been applied to a solid support, for example silica, in order to counter the effects of a possible hygroscopic nature.

The aluminum trisalkylacetoacetate is advantageously aluminum trisethylacetoacetate.

The tetralkylammonium benzoate is advantageously tetrabutylammonium benzoate, benzyltrimethylammonium benzoate and/or tetraethylammonium benzoate.

In an embodiment, the catalyst is present in an amount of 0.1% by weight-5.0% by weight, advantageously 0.3% by weight-2.0% by weight, particularly advantageously 0.5% by weight-1.0% by weight, based on the epoxy resin.

In an embodiment, the impregnating resin further comprises a reactive diluent. The term "reactive diluent" encompasses any organic compound which has a viscosity lower than that of the epoxy resin and thus reduces the viscosity of the impregnating resin. The lower viscosity of the impregnating resin increases the storage stability thereof. The reactive diluent is also utilized for controlling the viscosity of the impregnating resin. A regularably quality of the insulation in respect of impregnation defects and optimal resin content are achieved by setting of the viscosity. The lower viscosity of the reactive diluent compared to the epoxy resin additionally allows a higher proportion by mass of the inorganic particles in the impregnating resin compared to an impregnating resin having a comparable viscosity but without the reactive diluent.

The presence of the reactive diluent additionally reduces the concentration of the epoxy resin in the impregnating resin, as a result of which the rate of polymerization of the epoxy resin is decreased. As a result, the impregnating resin has a particularly long life before impregnation. The storage stability of the impregnating resin can thus be improved further by means of the reactive diluent.

The reactive diluent is advantageously styrene, a derivative of styrene such as vinyltoluene, or an organic compound which forms esters or polyesters. Styrene has a particularly low viscosity. In addition, styrene does not contribute to the polymerization of the epoxy resin which polymerizes by a mechanism which does not involve free radicals since styrene itself polymerizes only by a free-radical mechanism. The same applies to derivatives of styrene. The reactive diluent itself can, by means of an appropriate application, be removed entirely or partly from the impregnating resin, be incorporated as separate network into the cured electrical insulation body and/or be incorporated as constituent of the resin network into the cured electrical insulation body.

In an embodiment, the impregnating resin further comprises a thickener. The thickener increases the viscosity and can thus serve to adjust the viscosity of the impregnating resin. The thickener is advantageously an epoxide which is present with a high molecular weight in an oligomeric form, for example high molecular weight bisphenol A diglycidyl ether. With a view to the desired properties of the impregnating resin, it is also possible to use a mixture of one or more reactive diluents and one or more thickeners.

In an embodiment, the impregnating resin further comprises an initiator. The initiator serves for curing of the impregnating resin under a particular atmosphere, for example in the case of air curing, thermal curing, curing initiated by radiation or curing by a combination of the methods mentioned.

In an embodiment, the impregnating resin further comprises an acid. The acid enables the reactivity of the impregnated resin to be adapted. The acid is advantageously sulfuric acid, acetic acid, benzoic acid, succinic acid, malonic acid, terephthalic acid, isophthalic acid, oxalic acid and/or boric acid. The acid can also be a copolyester or a copolyamide having an acid number of at least 20. In a particular embodiment, the acid is oxalic acid and/or succinic acid.

In an embodiment, the acid is present in an amount of 0.01% by weight-10% by weight, advantageously 0.1% by weight-1.0% by weight, particularly 0.15% by weight-0.5% by weight, based on the epoxy resin.

The impregnating resin of the invention has the same insulating properties as known impregnating resins, as a result of which the long-term quality of the insulation under elevated electrical, mechanical and thermal stress is ensured.

In a further aspect, the invention provides an impregnatable electrical insulation tape for an electrical insulation body, wherein a hardener has been applied to the electrical insulation tape. The electrical insulation tape has not yet been impregnated and is thus impregnatable. The electrical insulation tape is advantageously an electrical insulation tape comprising mica and/or aluminum oxide.

The electrical insulation tape comprises an electrical insulation paper which advantageously comprises platelet-like mica and/or aluminum oxide particles and a support to which the electrical insulation paper has been applied to increase the strength and to improve the processability. The support is advantageously porous and electrically nonconductive. In an embodiment, the support is a knitted, a nonwoven, a foam, in particular an open-pored foam, a glass knitted, a glass roving, a woven fabric and/or a resin mat. The support advantageously comprises a polyester, in particular Dacron, and/or polyethylene terephthalate (PET).

The support is advantageously adhesively bonded to the electrical insulation paper. The porosity of the support and/or of the electrical insulation paper is such that the electrical insulation tape can be impregnated through by the impregnating resin.

In an embodiment, the electrical insulation tape is a mica tape. The production of mica paper and mica tapes is known.

The term "hardener" refers to compounds which can undergo a chemical reaction with the epoxy resin, as a result of which the epoxy resin goes over into a solid state (curing).

While in known insulations, the hardener is introduced as constituent of the impregnating resin into the electrical insulation body, according to the invention the hardener is applied to the electrical insulation tape. Application of the hardener to the electrical insulation tape represents a new possibility for introducing the hardener into the electrical insulation body. In this way, it is possible to use a hardener-free impregnating resin. On impregnation of the electrical insulation tape of the invention, the resin comes into contact with the hardener, so that the polymerization of the resin can commence. The use of a hardener-free impregnating resin has the advantage that the impregnating resin retains a low viscosity and has a high storage stability because of the absence of the hardener.

The hardener can have been applied to the entire electrical insulation tape or to a section of the tape. In an embodiment, the hardener has been applied to one of the two broad sides of the electrical insulation tape.

In an embodiment, the hardener has been applied to a first side of the electrical insulation tape and a catalyst has been applied to a second side of the electrical insulation tape which faces away from the first side. The terms "first side" and "second side" relate to the broad sides of the electrical insulation tape, i.e. to the two sides opposite one another having the greater surface areas. The spatially separate application of hardener and catalyst to different sides of the electrical insulation tape prevents reaction of the hardener with the catalyst during storage of the electrical insulation tape. This is because the reaction requires that the hardener and the catalyst come into contact with one another. Thus, the storage stability of the electrical insulation tape is increased by the spatially separate application of hardener and catalyst.

In an embodiment, the catalyst is selected from the group consisting of zinc naphthenate, cobalt naphthenate, zinc octoate, cobalt octoate, an imidazole, a tertiary amine, an aluminum trisalkylacetoacetate, aluminum trisacetylacetonate, aluminum alkoxide, aluminum acylate, a tetraalkylammonium benzoate and mixtures thereof.

The aluminum trisalkylacetoacetate is advantageously aluminum trisethylacetoacetate.

The tetraalkylammonium benzoate is advantageously tetrabutylammonium benzoate, benzyltrimethylammonium benzoate and/or tetraethylammonium benzoate.

In an embodiment, the hardener is selected from the group consisting of a substituted guanidine, an aromatic diamine, an N-acylimidazole, a metal salt complex or an imidazole, a carboxylic hydrazide, a triazine derivative, melamine, a melamine derivative, a cyanoacetyl compound, an N-cyanoacylamide compound, an acylthiopropylphenol, a urea derivative, an aliphatic diamine, a cycloaliphatic diamine, an aliphatic polyamine, a cycloaliphatic polyamine and mixtures thereof. These hardeners lead to a good storage stability of the impregnating resin.

In an embodiment, the hardener is in a solid state. The solid state of the hardener simplifies the storage of the electrical insulation tape compared to a hardener which is present in a liquid or partially gelled highly viscous state and contributes to the storage stability of the electrical insulation tape.

The production of the electrical insulation tape comprises the steps of application of the hardener to the first side of the electrical insulation tape and application of the catalyst to the second side of the electrical insulation tape which faces away from the first side. The order of the production steps is not relevant here. The hardener and/or the catalyst can, for example, be applied to the respective side of the electrical insulation tape by means of a deflection roller. Advantages are given to firstly one side and then the other side of the tape being provided with the hardener or the catalyst.

The hardener and/or the catalyst are advantageously applied in a liquid state to the electrical insulation tape. For this purpose, the hardener and/or the catalyst are temporarily brought into the liquid state, for example by introduction of heat. The introduction of heat can, for example, be effected by use of a heated roller for applying the hardener and/or catalyst to the electrical insulation tape. After application to the tape, the hardener and/or the catalyst becomes solid again. Due to the transition from the liquid state to the solid state, the hardener and/or the catalyst adhere particularly well to the electrical insulation tape. Owing to the strong adhesion, the electrical insulation tape has a good storage stability.

In a further aspect, the invention provides a process for producing an electrical insulation body, comprising the steps: a1) wrapping an electrical insulation tape around an electrical conductor; b) impregnating the electrical insulation tape from step a1) with an impregnating resin according to the invention; and c) curing the impregnating resin.

The soaking or impregnation of the electrical insulation tape with the impregnating resin of the invention and/or the curing of the impregnating resin are advantageously carried out by a vacuum pressure impregnation (VPI) process and/or a resin rich process. Here, a temperature of, for example, from about 50° C. to about 90° C. is set in the presence of a catalyst. Under these conditions, the hardener reacts with the epoxy resin, so that the impregnating resin partially gels. The curing of the impregnating resin is carried out at a higher temperature than impregnation, for example at about 150° C. or above, in order to make polymerization of the impregnating resin possible.

In an embodiment, the hardener is suspended in a solid state in the epoxy resin. In this case, the process can be carried out using a known electrical insulation tape. As a result of the solid/liquid two-phase system of epoxy resin and hardener, the storage stability of the impregnating resin increases.

In another embodiment, the process comprises, before impregnation of the electrical insulation tape, the following step: a2) mixing the epoxy resin with the inorganic particles, wherein the electrical insulation tape is an electrical insulation tape according to the invention and the impregnating resin in step b) is produced by contacting the mixture from step a2) with the electrical insulation tape from step a1). In this embodiment, use is made of an electrical insulation tape according to the invention, i.e. an impregnatable electrical insulation tape to which a hardener has been applied. As a result, a hardener-free mixture of epoxy resin and inorganic particles can be used for impregnating the electrical insulation tape. During impregnation of the electrical insulation tape, the mixture comes into contact with the hardener on the electrical insulation tape, so that the impregnating resin according to the invention is formed here. In this way, the impregnating resin can be stored without the hardener. Maintenance of a low viscosity of the resin during storage is aided thereby and a good storage stability is consequently achieved. The electrical insulation tape of the invention likewise has a good storage stability.

The process of the invention leads to an electrical insulation body which has the same insulation properties as known electrical insulation bodies. This ensures the long-term quality of the electrical insulation body under elevated electrical, mechanical and thermal stress.

In a further aspect, the invention provides an electrical insulation body which has been produced by the process of the invention. The electrical insulation body advantageously has a long life.

In a further aspect, the invention provides for the use of the electrical insulation body for the electrical insulation of rotating electrical machines, in particular generators. In these machines, the insulation is subjected to particularly high stresses. A long life of the electrical insulation body is therefore particularly important for long-term operational reliability of the machines.

The invention will be illustrated below in detail with the aid of examples.

In a first example, the impregnating resin comprises bisphenol F diglycidyl ether, dicyandiamide and aluminum oxide particles having an average particle diameter of about 20 nm.

In a second example, the impregnating resin comprises bisphenol F diglycidyl ether, dicyandiamide, aluminum oxide particles having an average particle diameter of about 20 nm and zinc naphthenate as catalyst.

In a third example, the impregnating resin comprises bisphenol A diglycidyl ether, benzoguanamine, aluminum oxide particles having an average particle diameter of about 20 nm and tetrabutylammonium benzoate.

In a fourth example, the impregnating resin comprises bisphenol F diglycidyl ether, 1,6-hexanediol diglycidyl ether, dicyandiamide, aluminum oxide particles having an average particle diameter of about 20 nm and zinc octoate.

In a fifth example, the impregnating resin comprises 3,4-epoxycyclohexylmethyl 3,4-epoxycyclohexanecarboxylate, dicyandiamide, aluminum oxide particles having an average particle diameter of about 20 nm and also tetrabutylammonium benzoate and zinc naphthenate.

In a sixth example, the impregnating resin comprises bisphenol F diglycidyl ether, dicyandiamide, 2-ethyl-4-methylimidazole and aluminum oxide particles having an average particle diameter of about 20 nm.

In a seventh example, the impregnating resin comprises bisphenol A diglycidyl ether, dicyandiamide, aluminum oxide particles having an average particle diameter of about 20 nm and styrene.

In an eighth example, the impregnating resin comprises bisphenol A diglycidyl ether, dicyandiamide, aluminum oxide particles having an average particle diameter of about 20 nm, styrene and high molecular weight bisphenol A diglycidyl ether.

In a further example, an electrical insulation body is produced by firstly wrapping a mica tape around an electrical conductor. The mica tape is subsequently impregnated in a resin rich process at 70° C. with an impregnating resin comprising bisphenol F diglycidyl ether, dicyandiamide, aluminum oxide particles having an average particle diameter of about 20 nm and zinc naphthenate. The impregnating resin is then cured at 150° C. to produce the finished electrical insulation body.

In a further example, an electrical insulation body is produced by wrapping a mica tape to which dicyandiamide has been applied around an electrical conductor. The mica tape is subsequently impregnated in a resin rich process with a mixture comprising bisphenol F diglycidyl ether and aluminum oxide particles having an average particle diameter of about 20 nm. The impregnating resin is formed by contact of the mixture with the dicyandiamide on the electrical insulation tape. The impregnating resin is then cured at 150° C. and by introduction of zinc octoate as catalyst in order to produce the finished electrical insulation body.

In a further example, an electrical insulation body is produced by wrapping a mica tape around an electrical conductor. The mica tape has dicyandiamide on one side and zinc naphthenate on a second side which faces away from the first side. The electrical insulation tape is impregnated in a vacuum-pressure impregnation process with a mixture comprising bisphenol A diglycidyl ether and aluminum oxide particles having an average particle diameter of about 20 nm. The impregnating resin is then cured at 150° C. to produce the finished electrical insulation body.

Embodiments of the electrical insulation tape of the invention are presented below with the aid of schematic drawings.

DETAILED DESCRIPTION OF INVENTION

Figure 1:
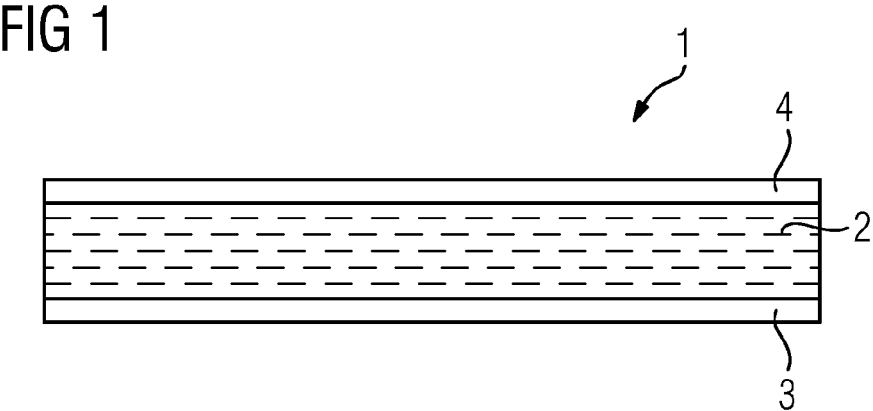
FIG. 1 shows a cross section of the electrical insulation tape of an embodiment.

FIG. 1 shows a cross section of the electrical insulation tape 1 according to the invention. The electrical insulation tape 1 is a mica tape which comprises a mica paper 2 and a nonwoven 3. Dicyandiamide has been applied as hardener 4 on one of the two broad sides of the electrical insulation tape 1.

Figure 2:
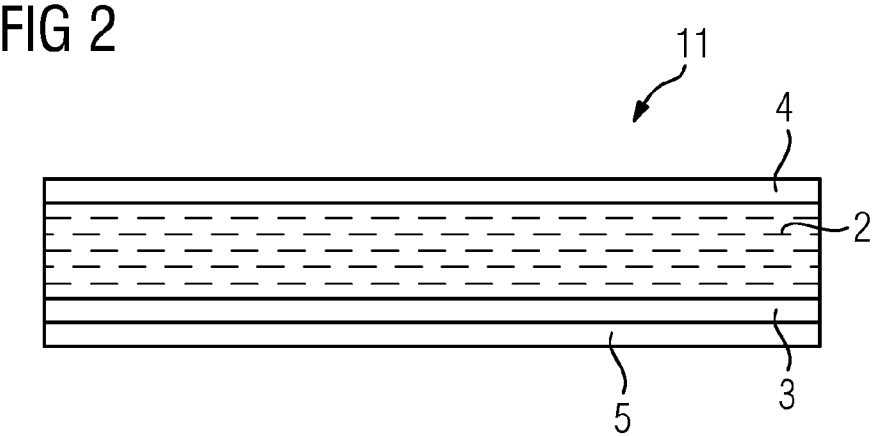
FIG. 2 shows a cross section of the electrical insulation tape of another embodiment.

FIG. 2 shows a cross section of the electrical insulation tape 11 according to the invention. The electrical insulation tape 11 is a mica tape comprising a mica paper 2 and a nonwoven 3. Dicyandiamide has been applied as hardener 4 to a first side. On a second side which faces away from the first side or is opposite the first side, zinc naphthenate has been applied as catalyst 5. The first side and the second side are the broad sides of the electrical insulation tape 11 which have a greater surface area than the remaining two sides of the electrical insulation tape 11.

The invention claimed is:

1. An anhydride-free impregnating resin for an electrical insulation body, wherein the impregnating resin comprises:
   an epoxy resin, a hardener and nanosize and/or microsize inorganic particles,
   wherein the hardener is selected from the group consisting of a substituted guanidine, an aromatic diamine, an N-acylimidazole, a metal salt complex of an imidazole, a carboxylic hydrazide, a triazine derivative, melamine, a melamine derivative, a cyanoacetyl compound, an N-cyanoacylamide compound, an acylthiopropylphenol, a urea derivative, an aliphatic diamine, a cycloaliphatic diamine, an aliphatic polyamine, a cycloaliphatic polyamine and mixtures thereof,
   wherein the hardener is suspended in a solid state in the epoxy resin.

2. The impregnating resin as claimed in claim 1, wherein the substituted guanidine is dicyandiamide.

3. The impregnating resin as claimed in claim 1, wherein the hardener is suspended in the form of particles in the epoxy resin.

4. The impregnating resin as claimed in claim 1, wherein the hardener is present in an amount of 1% by weight-15% by weight based on the epoxy resin.

5. The impregnating resin as claimed in claim 1, wherein the inorganic particles comprise aluminum oxide, aluminum hydroxide, silicon dioxide, titanium dioxide, rare earth oxide, alkali metal oxide, metal nitride and/or sheet silicates, in particular exfoliated or partially exfoliated sheet silicates.

6. The impregnating resin as claimed in claim 1, wherein the inorganic particles are present in an amount of 15% by weight-25% by weight based on the epoxy resin.

7. The impregnating resin as claimed in claim 3, wherein the hardener is suspended in the form of particles having a particle size of 1 µm-100 µm in the epoxy resin.

8. The impregnating resin as claimed in claim 4, wherein the hardener is present in an amount of 4% by weight-10% by weight based on the epoxy resin.

9. The impregnating resin as claimed in claim 6, wherein the inorganic particles are present in an amount of 17% by weight based on the epoxy resin.

10. An impregnatable electrical insulation tape for an electrical insulation body, comprising:
    a hardener in a solid state applied to the electrical insulation tape.

11. The electrical insulation tape as claimed in claim 10, wherein the hardener has been applied to a first side of the electrical insulation tape and a catalyst has been applied to a second side of the electrical insulation tape which faces away from the first side.

12. The electrical insulation tape as claimed in claim 11, wherein the catalyst is selected from the group consisting of zinc naphthenate, cobalt naphthenate, zinc octoate, cobalt octoate, an imidazole, a tertiary amine, an aluminum trisalkylacetoacetate, aluminum trisacetylacetonate, aluminum alkoxide, aluminum acylate, a tetralkylammonium benzoate and mixtures thereof.

13. The electrical insulation tape as claimed in claim 10, wherein the hardener is selected from the group consisting of a substituted guanidine, an aromatic diamine, an N-acylimidazole, a metal salt complex of an imidazole, a carboxylic hydrazide, a triazine derivative, melamine, a melamine derivative, a cyanoacetyl compound, an N-cyanoacylamide compound, an acylthiopropylphenol, a urea derivative, an aliphatic diamine, a cycloaliphatic diamine, an aliphatic polyamine, a cycloaliphatic polyamine and mixtures thereof.

14. The impregnatable electrical insulation tape of claim 10, further comprising a hardener-free liquid resin impregnated into the impregnatable electrical insulation tape, forming a solid/liquid two-phase system of hardener/resin in the impregnatable electrical insulation tape.

15. A process for producing an electrical insulation body, comprising:
    a1) wrapping an electrical insulation tape around an electrical conductor,
    b) impregnating the electrical insulation tape of step a1) with an impregnating resin to form a solid/liquid two-phase system of hardener/resin in the electrical insulation tape; and
    c) curing the impregnating resin.

16. The process as claimed in claim 15, further comprising:
    a2) mixing the epoxy resin with the inorganic particles;
    wherein the impregnating resin is produced in step b) by contacting the mixture from step a2) with the electrical insulation tape from step a1).

17. The process of claim 15, further comprising:
    prior to step a1), applying the hardener to the electrical insulation tape, and
    impregnating the electrical insulation tape in step b) with a hardener-free impregnating resin.

18. The process of claim 17, further comprising:
    applying the hardener to the electrical insulation tape in a liquid state, and
    allowing the hardener to transform to a solid state prior to step a1).

* * * * *